(No Model.) 2 Sheets—Sheet 1.

T. B. JEFFERY.
WHEEL TIRE.

No. 466,789. Patented Jan. 12, 1892.

Witnesses.
Jean Elliott
Julia Osler

Inventor.
Thos. B. Jeffery
By Burton and Burton
Attys.

(No Model.) 2 Sheets—Sheet 2.
T. B. JEFFERY.
WHEEL TIRE.
No. 466,789. Patented Jan. 12, 1892.
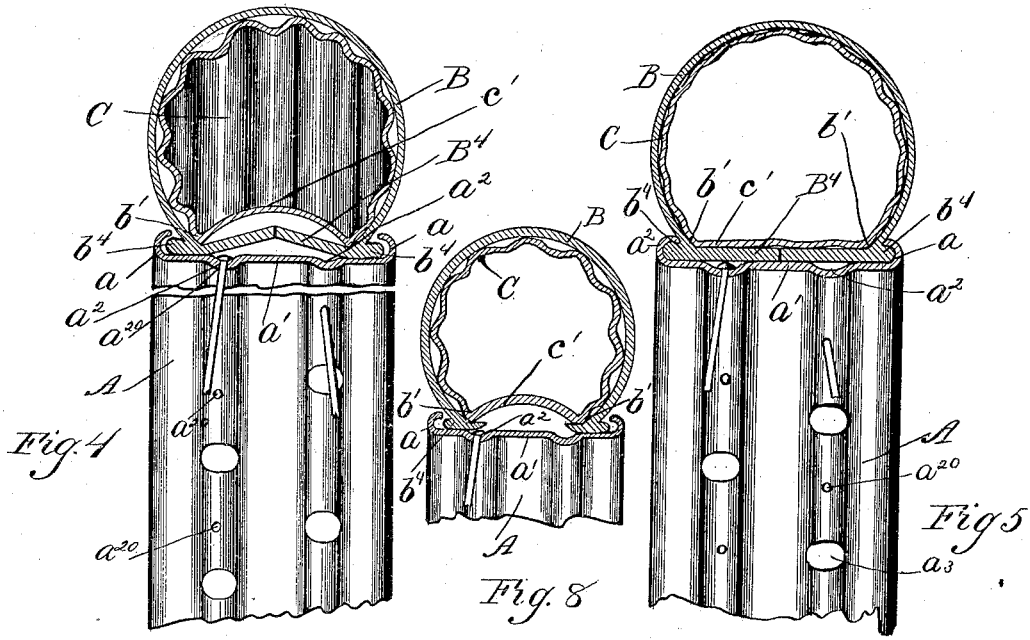
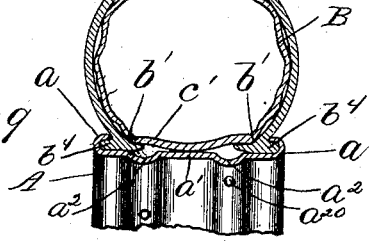
Witnesses
Dean Elliott
Julia Usler
Inventor
Thos. B. Jeffery
By Burton & Burton
Attys.
THE NORRIS PETERS CO., PHOTO-LITHO., WASHINGTON, D. C.

UNITED STATES PATENT OFFICE.

THOMAS B. JEFFERY, OF CHICAGO, ILLINOIS.

WHEEL-TIRE.

SPECIFICATION forming part of Letters Patent No. 466,789, dated January 12, 1892.

Application filed July 27, 1891. Serial No. 400,822. (No model.)

*To all whom it may concern:*

Be it known that I, THOMAS B. JEFFERY, a citizen of the United States, residing at Chicago, county of Cook, and State of Illinois, have invented certain new and useful Improvements in a Wheel-Tire, which are fully set forth in the following specification, reference being had to the accompanying drawings, forming a part thereof.

This invention comprises two prominent features, either of which may be utilized without the other, but which are combined in the tire which is hereinafter described. The first relates to means of securing the tire to the wheel, and the second is designed to diminish the danger of puncturing an inflated core and to prevent leakage of air through the same when it is punctured.

Figure 1:
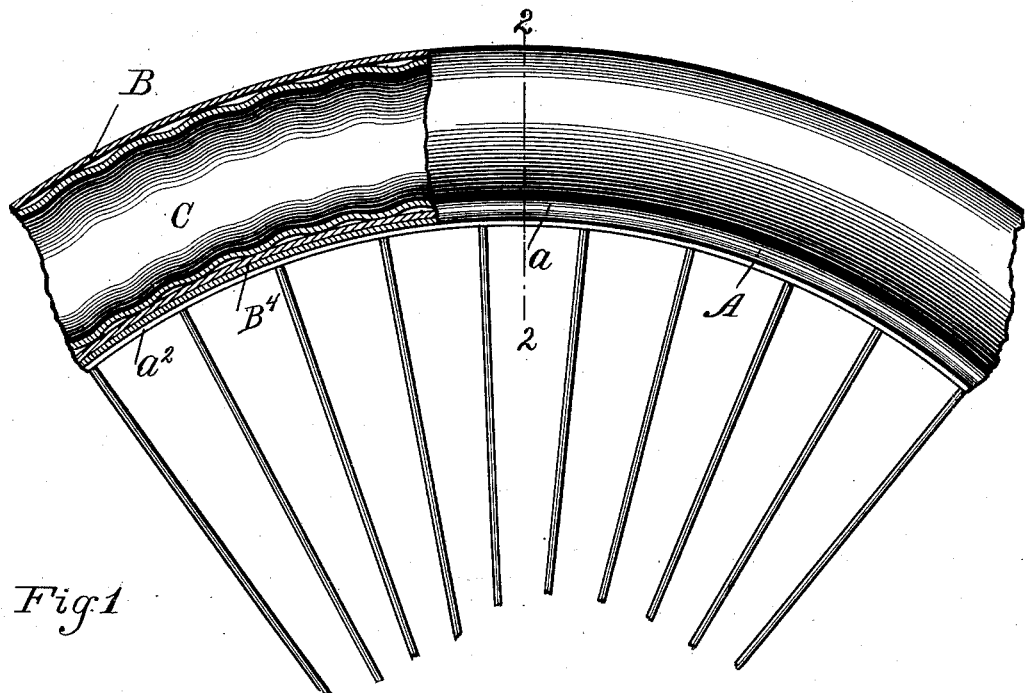
Figure 2:
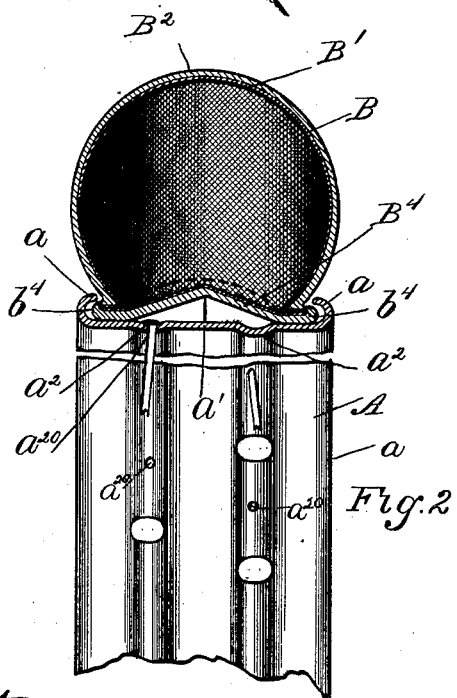
Figure 3:
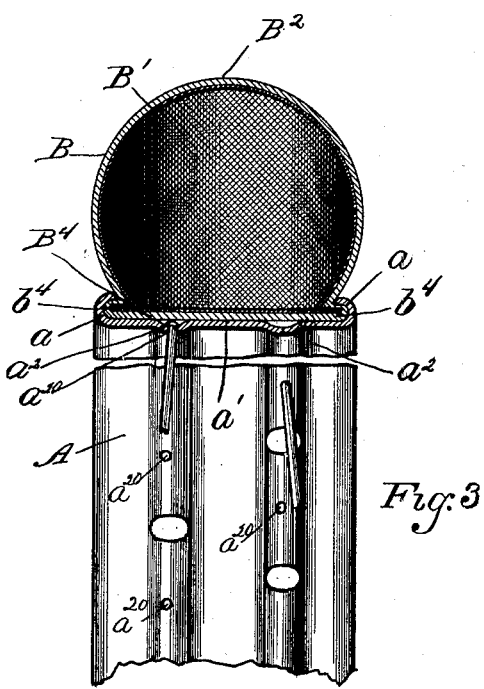

In the drawings, Figure 1 is a sectional side elevation of a portion of a wheel and tire embodying my invention, one-half of the figure being a section at the central plane of the wheel. Fig. 2 is a section at the line 2 2 on Fig. 1, showing the entire knot inflated and without an inflatable core. Fig. 3 is a similar view showing the same form of tire—that is, without an inflatable core—fully inflated and thereby locked in the rim. Fig. 4 is a similar section showing the tire with an inflatable core partially inflated, or, as it might appear, without inflation. Fig. 5 is a similar section of a similar tire, showing the inflatable core fully inflated. Fig. 6 is a perspective of a piece of a core longitudinally corrugated. Fig. 7 is a similar view of a piece of core circumferentially corrugated. Fig. 8 is a transverse section of a tire having a slightly-modified form of core not inflated. Fig. 9 is a similar view of the same tire shown in Fig. 8 with the core inflated.

A is the rim of the wheel; B, the exterior sheath or tube of the tire, which in some forms may constitute the entire tire—that is, may be used without an interior core.

C represents an interior inflatable core when such is to be employed.

I will first describe the tire as it may be used without an inflatable core, the outer sheath or tube B being itself inflatable. This tube or sheath may be made with a canvas lining or body B' and a tread B²; but when used without an inflatable core the canvas lining is not essential, though I prefer to so construct it in all cases. The inner circumferential wall or base B⁴ of the tube or sheath B in cross-section constitutes a re-entrant angle or curve—that is, it is formed transversely curved or angular—the curve or angle projecting toward the center of the circle to which the remainder of the tube in transverse section conforms. At the opposite lateral edges of this base the tire is provided with the exterior projecting beads or spurs $b^4$ $b^4$.

The rim A has the seat for the tire substantially cylindrical—that is, transversely without hollow or concavity (except certain grooves hereinafter referred to to accommodate the spoke-heads)—and at the opposite lateral edges said rim has the upturned flanges $a$ $a$ hooked inward toward each other and overhanging the tire-seat $a'$. The recess in the hooked or overhanging flanges $a$ is adapted to receive the laterally-projecting spurs or beads $b^4$ of the tire.

The tire in its normal condition—that is, when not inflated—may readily be inserted between the hooked flanges $a$ $a$, so that its opposite laterally-projecting spurs or beads $b^4$ will be in position to be lodged within the hooked flanges $a$ when properly forced apart laterally.

Upon inflating the tire the interior pressure of air will force the inner circumferential wall or base B⁴ outward—i. e., away from the center of the inflated cavity—until it rests upon the seat $a'$ of the rim, and in so doing, said base being transversely straightened, will force the spurs or beads $b^4$ into the hooks or hooked flanges $a$ of the rim, thereby effecting secure engagement between the tire and rim, which will continue so long as the tire is kept inflated, and pressure upon the tire when in use by increasing the tension of the air within the cavity of the tire will more securely hold the base thus straightened and seated, and thereby hold the beads or spurs $b^4$ more securely engaged with the hooks or flanges $a$ of the rim. The base B⁴ is made comparatively stiff, in order that when seated by the interior pressure it may not buckle or become crimped, but may force the beads $b^4$ apart and into the hooked flanges, as described. I do not prescribe or limit myself to any specific means of making this portion of the tire stiff as necessary; but it may be done by subjecting this portion to special vulcanizing process to harden it, or other means which will occur to the rubber-manufacturer may be employed.

When an interior inflatable core C is to be employed with a sheath of the construction already described, the operation in inflation will be substantially the same as already described, the interior core being very flexible and acting against the re-entrant base B⁴ with substantially the same effect as is produced by the direct action of the compressed air within the cavity against such base, but with somewhat greater certainty. When such core is to be employed, it is not necessary that the sheath should be air-tight, the core being relied upon to retain the air, and the most convenient method of introducing the core is to have the sheath split circumferentially at the middle of the base B⁴, so that the core may be introduced bodily through the rift thus made. This rifting of the base at the middle point, as shown in Fig. 3, does not interfere at all with the mechanical action of the sheath or tube B in locking the same to the rim by the engagement of the spurs or beads of the tire with the flanges of the rim, because the edges abutting at the rift act against each other as the core is inflated and tends to force the base B⁴ down to the seat $a'$ precisely as if no division had been made. Considering the action of the device as thus constructed, it will be seen that the two halves of the base thus rifted act as levers against each other at their edges abutting at the rift to force the beads at the opposite edge of such levers into the hooks or seats prepared for them in the rim, and this conception of this feature is to be regarded as substantially the equivalent of the conception primarily suggested—viz., that the base is re-entrant into the circle to which the remainder of the sheath in transverse section conforms. The broad rim, which is desirable in this construction, in order to afford the greatest security in the mode of fastening the tire to the rim, makes desirable securing the spokes at two lines or planes, instead of all at one central plane, as is customary. I have therefore shown such a construction, alternate spokes being secured in planes at opposite sides of the central or equatorial plane of the wheel. In order that the heads of the spokes may not protrude into the tire or prevent the base B⁴ from seating broadly on the seat $a'$, I provide the grooves $a^2$ $a^2$ in the rim in the planes of the spoke-apertures $a^{20}$, and in said grooves the spoke-heads are lodged, so that they do not protrude above the general surface of the seat $a'$, said seat being thus divided into three parts alternating with the two grooves, said three parts being all equally elevated and affording a continuous seat for the tire, as above described.

Heretofore inflatable cores for wheel-tires have been so constructed as to be distended when inflated—that is, the wall or skin of the inflatable core has been made of elastically-extensible material, and the core has been made enough smaller than the sheath by which it was to be retained, so that when inflated to the full capacity of the sheath said extensible wall or sheath has been stretched. When thus constructed and distended, the skin is exceedingly liable to puncture, and when punctured even by the finest point it will gap open at the puncture, and the same will extend by the mere cohesion of the surrounding material until a mere pin-prick will become a wide-open gap. I aim to prevent such a result by making the inflatable core in its normal condition—that is, when not distended—larger than the interior cavity of the sheath. It is sufficient for the purpose that it be larger in either dimension, but is preferably larger both transversely and longitudinally or circumferentially with respect to the wheel. Such core therefore, when placed within the sheath before inflation, will be wrinkled or creased, as seen in Fig. 3, and when fully inflated these wrinkles or creases will disappear or diminish only by the compression of the substance of the skin or wall of the core between the exterior sheath and the interior compressed air, so that when thus inflated, as in the condition of use, instead of being stretched it is in the opposite condition, and if punctured the reaction of the material tends to close up the puncture, and the greater the interior pressure due to the compressed condition of the air the more forcible the action of the substance of the skin tending to close the gap or puncture, so that even a cut of considerable length will be held close by the interior pressure, the edges of the cut under such pressure acting very much as a check-valve, closing the tighter the greater the pressure of air seeking escape.

The core may be formed with corrugations either longitudinal, as in Fig. 6, or circumferential, as in Fig. 7, so that when placed in the sheath it shall not be irregularly wrinkled or creased, and the corrugations may not be wholly obliterated or flattened out in the inflating, but only diminished. There is an advantage in having the corrugations or wrinkles greater than can be wholly obliterated—viz., that any puncturing-point which may be driven through the sheath has less chance of encountering the wall of the core when it is thus corrugated or wrinkled, because it may strike between the corrugations, and if it does strike the crest of a wrinkle or corrugation the latter will yield and not stand so rigidly against the point as if there were no wrinkle.

If the base portion $c'$ of the inflatable core be arched inward, following in general the feature of construction which characterizes the sheath, inflation of the core tending to straighten that part will cause the core to a degree varying according to the stiffness of this arched portion to intensify the effect attributed to the corresponding construction of the sheath—to wit., making the exterior beads of the lateral edges seat firmly in the hooked flanges of the rim, because the core will not slip much from its lodgment in the corners $b'$ of the cavity of the sheath in the process of inflation, and if the said base portion $c'$ of the core has any stiffness the straightening of that base in inflation will cause it to push against the sheath in the corners $b'$ and add so much to the force which will hold the tire in engagement with the rim. This suggests a modification which is present in Figs. 8 and 9, wherein the core having the stiff base arched inward serves directly and solely as the means of forcing the lateral edges of the sheath apart and into engagement with the rim.

The description herein of the form of the base as arched or folded inward or forming a re-entrant curve or angle is to be understood as referring to the form at the instant the tire is inserted between the flanges of the rim and before it has been caused to protrude its spurs sidewise under said flanges. The tire may be so molded as to require lateral compression to cause it to enter between the flanges, and such lateral compression will give the base the described re-entrant form.

For convenience in removing the tire from the rim when it is collapsed or relieved from the interior air-pressure, I provide the small holes $a^3$ large enough to insert the finger or a small tool about the size of a lead-pencil to push up the base $B^4$, so that the spurs or beads $b^4$ may be withdrawn from the flanges to permit the removal of the tire from the rim. This construction is desirable, because when the tire has been for some time inflated and the base thereby seated and the spurs closely engaged with the flanges of the rim the rubber may adhere somewhat to the rim both at the seat $a'$ and also in the hooks or flanges, and even if it does not adhere it may have no tendency to assume the re-entrant form after having been so long straightened.

I claim—

1. An inflatable tire having the base or inner circumferential wall of stiff material adapted to resist buckling or creasing, such base being transversely folded or arched inward, forming a re-entrant angle or curve and provided with exterior laterally-projecting beads or spurs at the opposite edges of said base, substantially as set forth.

2. An inflatable tire having the base or inner circumferential wall of stiff material adapted to resist buckling or creasing transversely folded or arched inward, forming a re-entrant angle or curve and provided with laterally-projecting beads or spurs $b^4$ at the opposite edges of said base, in combination with a rim having a seat for the inner circumferential wall of the tire bounded by hooked or overhung flanges adapted to receive the beads or spurs of the tire, substantially as set forth.

3. A tire-sheath having a base or inner circumferential wall of stiff material adapted to resist buckling or folding transversely arched or folded inward, forming a re-entrant angle or curve and provided with exterior laterally-projecting beads or spurs at the opposite edges of such base, combined with a flexible inflatable core within such sheath, adapted when inflated to press outwardly against such base, substantially as set forth.

4. A tire-sheath having the base or inner circumferential wall transversely folded or arched, forming a re-entrant angle or curve and provided with exterior laterally-projecting beads or spurs at the opposite edges of such base, in combination with a flexible inflatable core within such sheath, adapted when inflated to force the base outward, in combination with the rim having a seat for the base of the sheath laterally bounded by the hooked or overhanging flanges adapted to receive the beads or spurs of the base, substantially as set forth.

5. In a tire, in combination, substantially as set forth, a sheath B and the inflatable core C therein, the sheath being comparatively as respects the core non-extensible and the core being larger than the cavity of the sheath, whereby the substance of the skin or wall of the core is compressed when inflated between the interior inflating air and the exterior retaining-sheath.

6. In a tire, an exterior sheath, combined with an interior inflatable core, said core being corrugated, substantially as and for the purpose set forth.

7. In combination with the sheath having its inner circumference at lateral edges, the exterior and oppositely-projecting spurs or beads $b^4$, and the interiorly-projecting lever-base, in combination with an inflatable core within said sheath and adapted when inflated to press outwardly against such lever-base, and the rim having the seat to stop the outward movement of the lever-base at the middle part, and the flanges or hooks at its edges to receive the lateral projections of the sheath, substantially as set forth.

8. A vehicle-wheel having a broad rim, in combination with an elastic tire seated therein, the rim having spoke-holes in two parallel planes at opposite sides of the equatorial plane of the tire, said rim having the tire-seat provided with two peripheral grooves in the planes of said spoke-holes, and spokes connected at said holes in the two planes and having their heads lodged in said grooves, substantially as set forth.

9. A tire-sheath having at its inner circumference at the opposite lateral edges outwardly-projecting beads or spurs, in combination with the rim having the tire-seat bounded by hooks or flanges to engage said spurs, and the inflatable core within such sheath, having its base normally inwardly arched and lodged at its corners or angles against the sheath directly inward from said exterior spurs or beads, said base of the core being stiff and adapted to resist creasing or folding, whereby the inflation of the core causes its base to straighten and force the spurs of the sheath into engagement with the rim, substantially as set forth.

In testimony whereof I have hereunto set my hand, in the presence of two witnesses, at Chicago, Illinois, this 23d day of July, 1891.

THOS. B. JEFFERY.

Witnesses:
CHAS. S. BURTON,
JEAN ELLIOTT.